United States Patent [19]

Hwang et al.

[11] Patent Number: 4,935,942
[45] Date of Patent: Jun. 19, 1990

[54] DATA SAMPLING ARCHITECTURE

[75] Inventors: Jin H. Hwang, Cerritos; Patrick D. Conley, Fullerton, both of Calif.

[73] Assignee: Western Digital Corporation, Irvine, Calif.

[21] Appl. No.: 325,191

[22] Filed: Mar. 16, 1989

[51] Int. Cl.⁵ .............................................. H04L 7/08
[52] U.S. Cl. .................................. 375/106; 307/602; 375/117
[58] Field of Search ................. 375/95, 117, 118, 106; 370/49; 328/72, 74, 109, 110; 307/269, 590, 593, 595, 601, 602

[56] References Cited

U.S. PATENT DOCUMENTS

| 4,544,914 | 10/1985 | Chan et al. | 307/269 |
| 4,675,546 | 6/1987 | Shaw | 307/602 |
| 4,797,572 | 1/1989 | Metz | 307/602 |

Primary Examiner—Benedict V. Safourek
Attorney, Agent, or Firm—Christie, Parker & Hale

[57] ABSTRACT

The present invention provides an architecture for sampling incoming asynchronous data pulses and providing synchronous output pulses having a constant pulse width. The invention has an input stage comprising a toggling flip-flop receiving the asynchronous pulses on the clock input. The complementary output of the flip-flop is provided to a dual path synchronizer stage followed by a dual path one-shot stage to terminate the synchronized pulse.

3 Claims, 5 Drawing Sheets

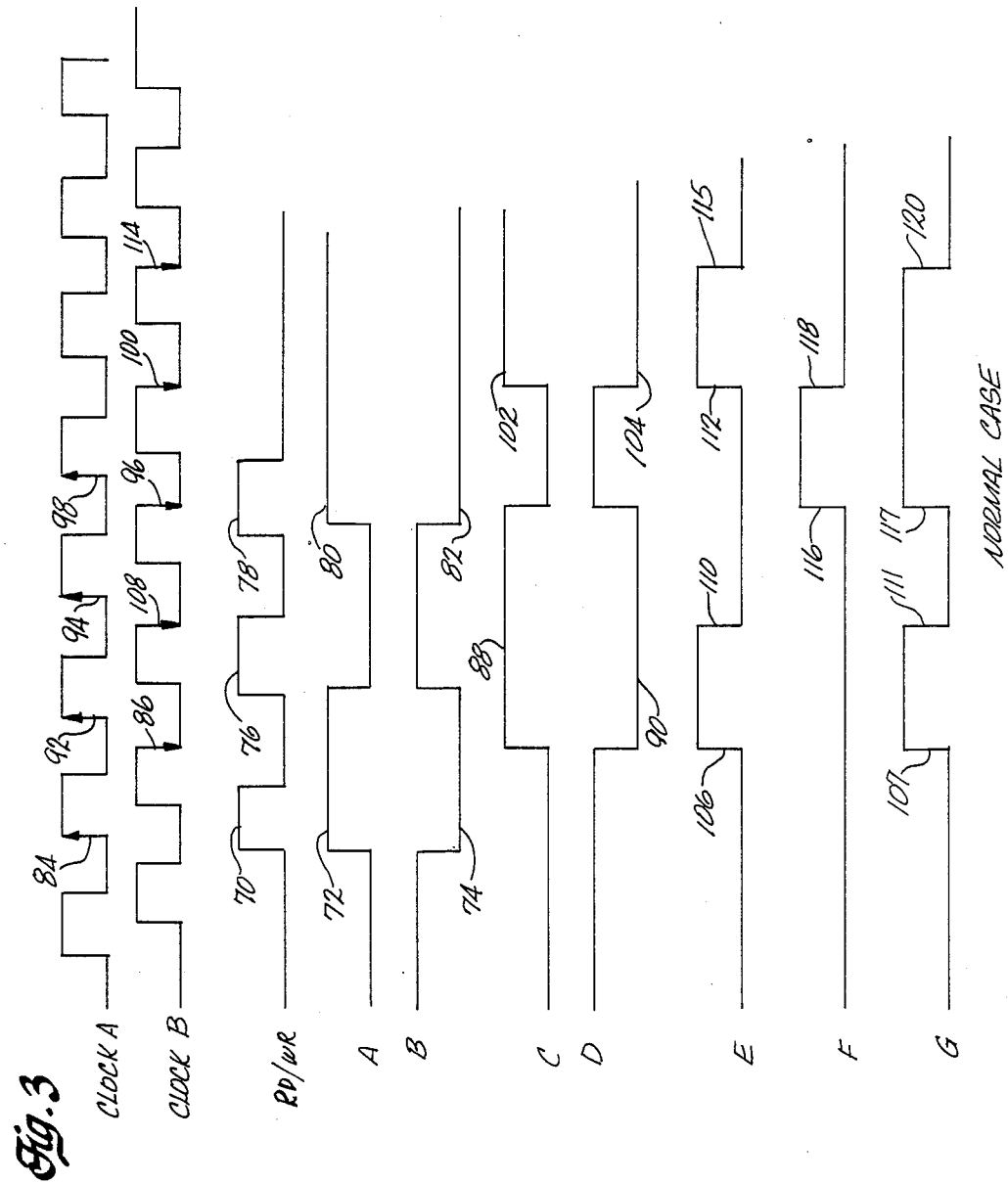

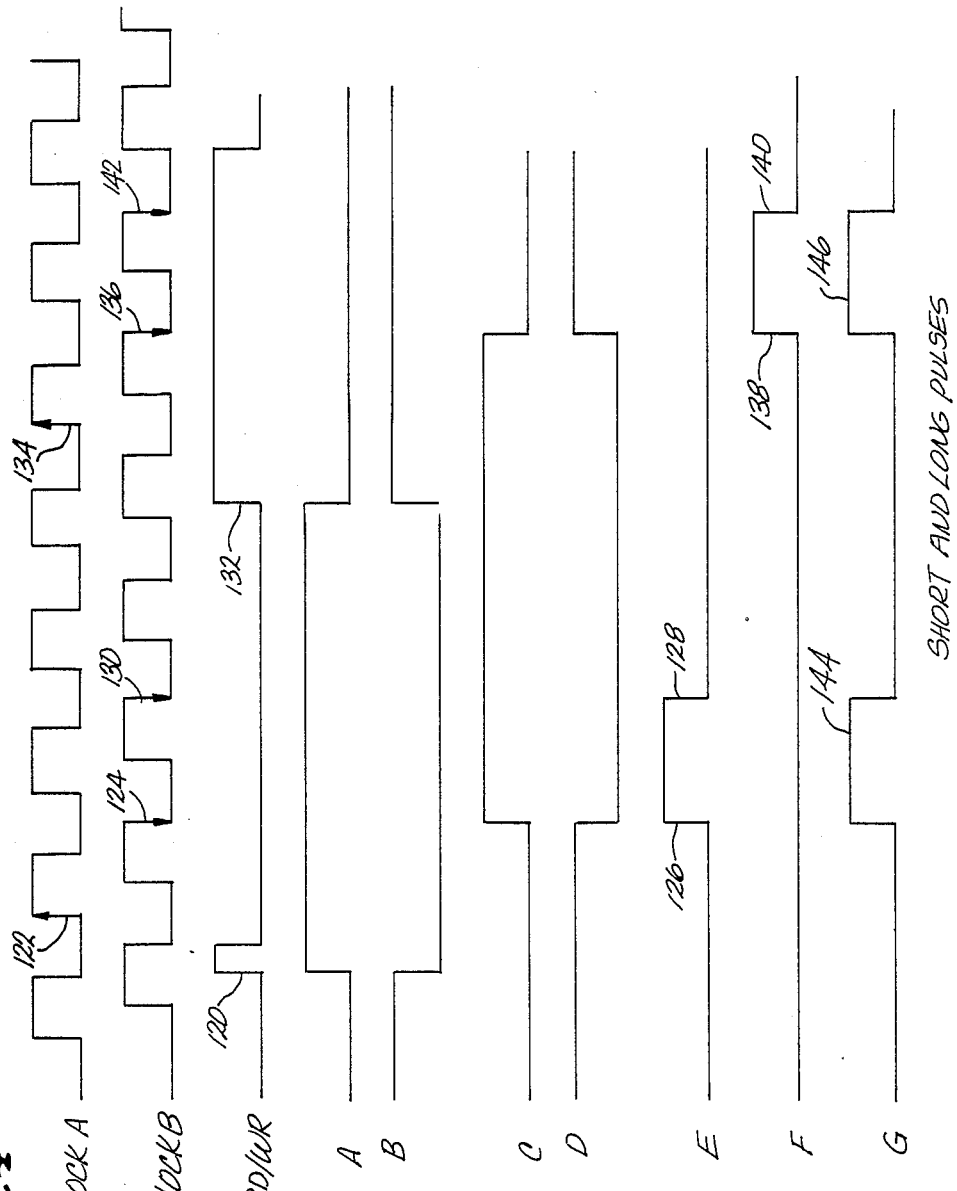

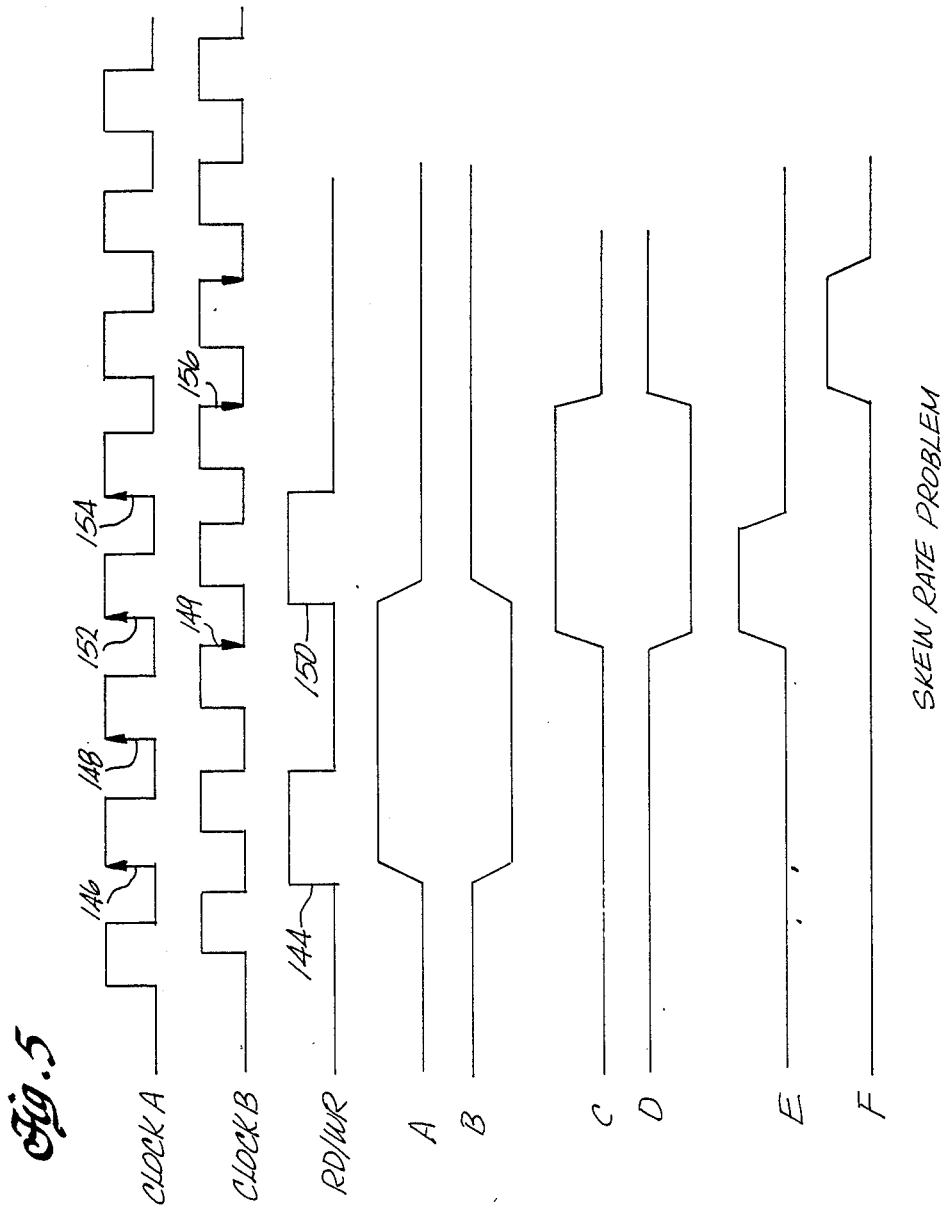

4,935,942

DATA SAMPLING ARCHITECTURE

FILED OF THE INVENTION

The present invention pertains generally to pulse synchronizers for asynchronous digital communication. More particularly, the invention provides a binary logic device for sampling and converting asynchronous pulses with varying high frequency and pulse width to synchronized pulses with specific pulse width.

BACKGROUND OF THE INVENTION

Modern digital devices operate asynchronously from one another for maximum efficiency. Interfaces for communications between devices, therefore, require synchronizing circuits which receive the digital pulses from an external device and synchronize the pulses with an internal clock. For example, peripheral controllers for disk drives and other system components must communicate with the drive and a host computer, both of which operate asynchronously from the controller with differing data transfer rates. Commands and data transferred from the host must be synchronized for use within the disk controller for interpretation or storage prior to transfer to the disk drive.

Most current disk controllers use a buffer memory for temporary storage of data transferred between the disk drive and the host computer. To accommodate differing data transfer band width between the buffer memory and the host computer or disk drive, a first-in first-out (FIFO) sub-buffer is typically used. Using communication between the host computer and the peripheral controller as an example, transfer of data from the FIFO to the host computer is accomplished under the control of a READ or WRITE signal issued by the host. This signal is asynchronous to the internal clock of the peripheral controller. Transfer from the buffer memory to the FIFO is accomplished synchronously in the controller. In coordinating the data transfer, the controller must monitor the number of data bytes present in the FIFO. Most prior art systems employ an UP/DOWN counter which synchronously monitors the circular pointers of the FIFO.

The number of bytes present in the FIFO as indicated by the counter is then interpreted by the controller for communication control with the host. However, due to basic latency in the circuit, with one pointer changing asynchronously the number of bytes actually present in the FIFO may not be properly indicated by the counter resulting in inaccurate control of the transfer and the potential underrun or overrun of the FIFO by the host, depending on the direction of transfer. Data may therefore be lost in the overrun or underrun condition.

FIFOs must, therefore, be designed with greater depth and control of the transfer initiated with more bytes remaining in the FIFO to avoid the overrun/underrun conditions.

To reduce the oversizing requirements for the FIFO, it is desirable to synchronize the incoming READ or WRITE pulse from the host with the minimum latency to provide the greatest accuracy in the counter. Prior-art pulse synchronizers are typically constructed either of phase lock loops, which are complex and sensitive to periods of no input, or of single or multiple serial flip-flops to capture and synchronize the incoming asynchronous pulse. In this arrangement, the first flip-flop samples the input for the asynchronous pulse and, if the input has fully transitioned, then the output of flip-flop will transition. Subsequent serial flip-flops determine the width of the desired output pulse and reset the circuit. These prior-art designs are sensitive, however, to varying input pulse width and pulses which occur very near the internal clock pulse strobing the flip-flops.

Further, design of such prior-art devices normally is limited by the Nyquist criterion requiring the internal clock rate to be greater than two times the incoming asynchronous data transfer rate.

SUMMARY OF THE INVENTION

The present invention is a synchronizer circuit for use in a device having an internal clock. The present invention reliably produces a synchronized output pulse in response to asynchronous input pulses of varying frequency and pulse width. Further, the asynchronous input pulses may occur at any relative phase to the internal clock and still be captured. In addition, the Nyquist criterion is relaxed, allowing data transfer rates as high as 80% of the internal clock frequency.

The present invention receives asynchronous pulses on an input port. An input stage in communication with the input port produces a state transition in response to the leading edge of the received pulse. A synchronizing stage responsive to the state transition of the input stage provides a synchronized state transition to the input of a one-shot stage. The one shot produces a pulse having a synchronized leading edge in response to the state transition of the synchronizer stage, and a synchronized trailing edge in response to the next falling edge of the internal clock.

The input stage of the invention may be embodied in a toggling flip-flop having inverting and non-inverting outputs which is clocked by the rising edge of the incoming pulse. The synchronizer stage comprises a first pair of complementary flip-flops clocked by the rising edge of a first internal clock. One flip-flop of the pair receives the non-inverting output of the toggling flip-flop, while the second receives the inverting output. A second pair of flip-flops receive the outputs of the first flip-flop pair and are clocked by the trailing edge of a second internal clock having the same frequency as the first clock, but phase-shifted to lag by no more than 180 . The one-shot stage includes a third complementary pair of flip-flops receiving the output of the second flip-flop pair and clocked by the second clock signal. The inverting outputs of the third pair of flip-flops are logically ANDed with their respective inputs to provide an output signal pair for the one shot. The outputs of the one shot are then logically ORed to provide the synchronized output.

BRIEF DESCRIPTION OF THE DRAWINGS

FIG. 3 is a timing diagram showing signals produced at various locations about the circuit of FIG. 2 in normal use.

FIG. 4 is a timing diagram showing signals produced at various locations about the circuit of FIG. 2 when the input pulse is very long and very short.

FIG. 5 is a timing diagram showing the signals at various points in the circuit of FIG. 2 when the input signals occur very near to the clock pulses.

DETAILED DESCRIPTION OF THE INVENTION

Figure 1:
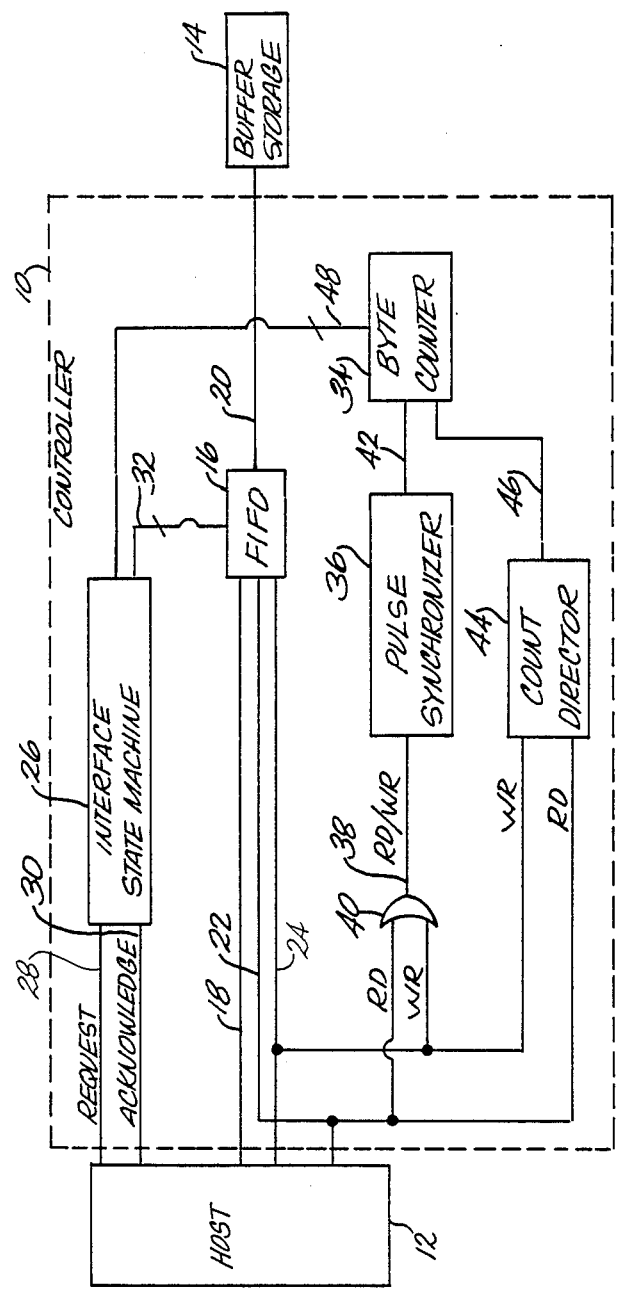
FIG. 1 is a block diagram of a pulse synchronizer according to the present invention in a typical application to a peripheral controller.

Referring to FIG. 1, the present invention is shown incorporated in a peripheral controller circuit 10. The controller transmits data between a host computer 12 and a buffer storage memory 14. A FIFO sub-buffer 16 is connected to the host computer by data bus 18 and to the buffer storage memory by data bus 20.

Data transfer between the host and FIFO is controlled by asynchronous READ 22 and WRITE 24 strobes issued by the host. The FIFO is enabled for transfer by an interface state machine 26, which provides standard handshake communications with the host computer, such as DMA commands for request 28 and acknowledge 30, as well known to those skilled in the art. The interface state machine provides commands enabling the FIFO and executing READ and WRITE operations to the buffer storage memory on control lines 32. READ and WRITE commands to the buffer storage are synchronous with the internal clock for the controller.

A byte counter 34 counts the number of data bytes present in the FIFO counting up or down with synchronous data transfers between the buffer storage and the FIFO. The present invention shown as the pulse synchronizer 36 receives a READ/WRITE strobe on line 38 from OR gate 40 connected to the READ and WRITE signal lines from the host. The READ/WRITE strobe is synchronized by the invention to the internal clock and provided to increment or decrement the byte counter on line 42. The direction of transfer is determined by a count director 44, which receives the READ and WRITE signals from the host and signals the byte counter for the direction of count on line 46. The byte count is provided to the interface state machine on line 48. The interface state machine in the controller will allow or deny data transfer between the host and FIFO, based on the byte count, through the use of the DMA protocol.

A complete embodiment for a controller as described above is disclosed in the U.S. patent application Ser. No. 07/324,313 filed on 3/16/89 for a FIFO Control Architecture and Method to Conley, et al., having a common assignee with the present application and filed substantially concurrently therewith, the disclosure of which is incorporated herein by reference.

Figure 2:
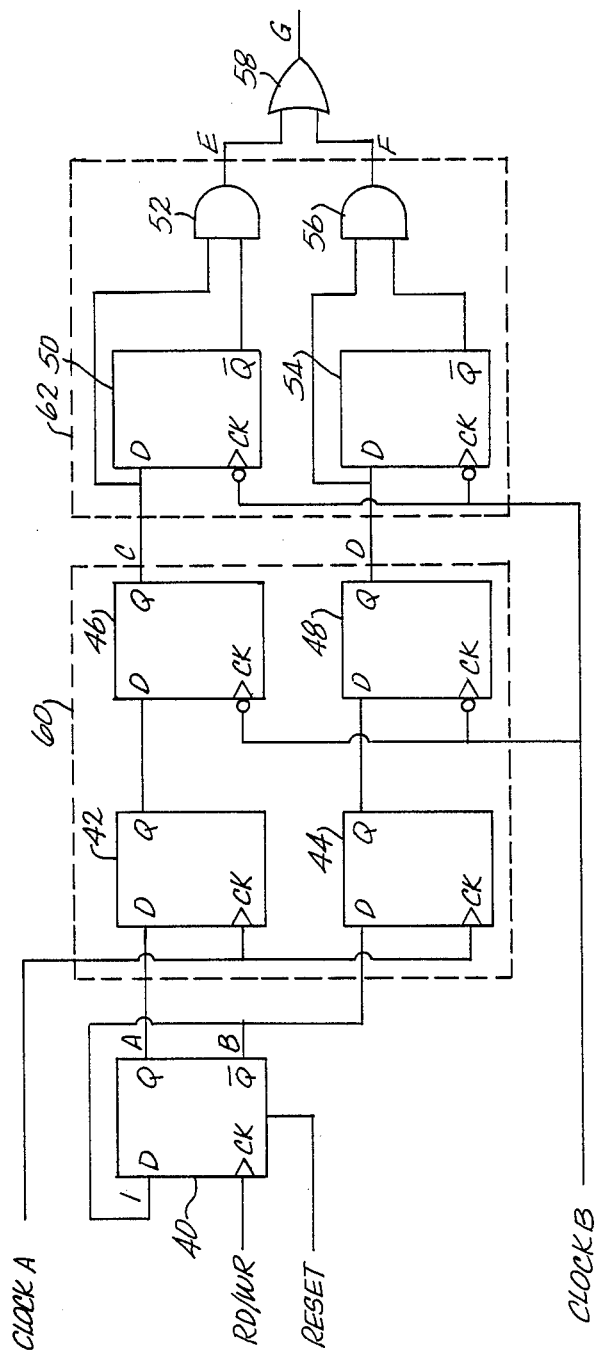
FIG. 2 is a circuit diagram of a pulse synchronizer according to the present invention.

While the operation of the pulse synchronizer has been explained specifically in the context of a peripheral controller, the invention may be used in a wide variety of applications where an asynchronous input must be converted to synchronous pulses of a predefined width. The pulse synchronizer of the present invention is shown in greater detail in FIG. 2. The READ/WRITE strobe RD/WR is connected to the clock input of a first D-type edge-detecting flip-flop 40 forming the input stage of the circuit. RD/WR is normally low and, when a READ or WRITE request is made, a positive polarity pulse occurs at the clock input. The non-inverting output of the first flip-flop is connected to the input of a second flip-flop 42 and is labeled signal A. The inverting output of the first flip-flop is connected as the input of a third flip-flop 44 and is labeled signal B. The non-inverting output of the second flip-flop is connected to the input of a fourth flip-flop 46, which provides a non-inverting output labeled signal C. The non-inverting output of the third flip-flop is connected to the input of a fifth flip-flop 48, which provides a non-inverting output labeled signal D. The second, third, fourth and fifth flip-flops comprise a synchronizing stage 60.

The C signal is the input of a sixth flip-flop 50. The inverting output of the sixth flip-flop is ANDed with signal C in gate 52, providing an output labeled signal E. The inverting output of the fifth flip-flop, which is labeled signal D is connected to the input of a seventh flip-flop 54. The inverting output of the seventh flip-flop is ANDed with signal D in gate 56, providing an output signal F. The sixth and seventh flip-flops and their associated AND gates form a one-shot stage 62. The output of the one shot signals E and F are ORed through gate 58 to provide an output for the synchronizer labeled signal G. Initialization of the circuit is accomplished through the use of a reset signal RESET connected to the first flip-flop, which resets the inverting and non-inverting inputs to 0 and 1, respectively, when asserted.

Clocking for the embodiment of the invention shown in the drawings is provided by two clock signals CLOCKA and CLOCKB having the same frequency. CLOCKB in the preferred embodiment lags CLOCKA by a phase shift of 90. A phase shift of up to 360 may be employed to adjust the invention for latencies in the controller circuit. CLOCKA and CLOCKB are one-half the frequency of the system clock for the peripheral controller. CLOCKA provides clocking for the second and third flip-flops 42 and 44, while CLOCKB provides clocking for the fourth, fifth, sixth and seventh flip-flops 46, 48, 50 and 54. The CLOCKA flip-flops are triggered on the leading edge of the signal, while the CLOCKB flip-flops are triggered on the trailing edge of the signal.

FIG. 3 provides a timing diagram to demonstrate operation of the circuit in response to a typical string of RD/WR strobe inputs. For the examples shown, it is assumed that the circuit is initially reset, providing signal A low and signal B high. The first input pulse 70 arrives at the clock input of the first flip-flop and triggers the flip-flop to sense the state of the D input, which is currently high due to the reset condition. Accordingly, signal A goes high and signal B goes low to form the leading edges of an A signal pulse 72 and a B signal pulse 74. When the next RD/WR strobe 76 arrives, the first flip-flop toggles and signal A goes low while signal B goes high, terminating the pulse. At the next RD/WR strobe 78, the first flip-flop is again toggled, driving signal A high and signal B low, beginning a new A signal pulse 80 and B signal pulse 82.

The state transitions of the first flip-flop are input to the synchronizing stage. When the second and third flip-flops of the synchronizer stage are clocked by the rising edge 84 of CLOCKA, signal A is high and signal B is low. Accordingly, the second flip-flop provides a high signal to the fourth flip-flop, while the third flip-flop provides a low signal to the fifth flip-flop. The next falling edge 86 of CLOCKB clocks the fourth and fifth flip-flops, causing signal C to go high and signal D to go low, initiating the C pulse 88 and the D pulse 90. At the next rising edge 92 of CLOCKA, there is no change in either signal A or signal B. Accordingly, signals C and D are unaffected. At the next rising edge 94 of CLOCKA, signals A and B have changed with signal A low and signal B high. Accordingly, on the next falling edge 96 of CLOCKB, the values of signals C and D will change, with signal C going low and signal D going high. Similarly, on the next rising edge 98 of CLOCKA, signals A and B have again changed as represented by pulses 80 and 82, which propagate through the synchronizer and are clocked to output signals C and D on the next falling edge 100 of CLOCKB. This generates new pulses 102 and 104 in signals C and D, respectively.

Signals C and D are received by the sixth and seventh flip-flops in the one-shot stage and the AND gates 50 and 54, respectively. Following the signal E curve in FIG. 3, initially the signal C is low, resulting in a high output from the inverting output of the sixth flip-flop. When signal C transitions to high, the output of the AND gate 50 is driven high, providing the rising edge 106 of signal E. This signal is reflected through OR gate 58 as the rising edge 107 of signal G. On the next falling edge 108 of CLOCKB, the sixth flip-flop is clocked, resulting in a low output from the flipflop, resulting in a NOT TRUE through the AND gate 52, causing the falling edge 110 of the first pulse on signal E. Correspondingly, the output of the OR gate goes low, providing the falling edge 111 on signal G.

Similarly, signal D entering the seventh flip-flop is initially high, resulting in a low output from the flip-flop, making AND gate 56 NOT TRUE, providing a corresponding low output on signal F. When signal D goes low, there is no change in signal F. On the falling edge 108 of CLOCKB, the low signal present in the input of the seventh flip-flop is clocked to the non-inverting output, resulting in a high signal to the AND gate 56; however, signal D is currently low, and AND gate 56 remains NOT TRUE. However, when signal D goes high, both signal D and the inverting output of the seventh flip-flop are high, creating a true condition on AND gate 56 and a high output on signal F, generating the rising edge 116 of the first signal F pulse. Correspondingly, signal G is again drive high, resulting in leading edge 117. On falling edge 100 of CLOCKB, signal F is again driven low, resulting in falling edge 118. However, simultaneously, signal C has gone high in pulse 102, creating a rising edge 112 on signal E, maintaining the OR output on signal G high. The falling edge 114 of CLOCKB returns signal E to low with edge 115, resulting in signal G going low with edge 120. The synchronized pulses corresponding to the RD/WR strobes present on signals E and F are of finite width and synchronized with the peripheral controller internal clock. Therefore, signal G is resolvable without a return to zero between the high levels indicating the presence of a RD/WR strobe.

FIG. 4 demonstrates the capability of the invention to accept input signals of varying width. The first RD/WR strobe 120 is shown with a narrow pulse width approximately one-fourth the period of the internal clock signals. As previously described with respect to FIG. 3, when the pulse is received at the clock input of the first flip-flop, a transition in signals A and B occurs. This asynchronous transition is detected in the second and third flip-flops of the synchronizer stage at the next rising edge 122 of CLOCKA. Signals C and D are changed at the next falling edge 124 of CLOCKB. Simultaneously, signals C and D are applied to the AND gates 52 and 56, and the leading edge 126 of signal E occurs. The trailing edge 128 of signal E results when the sixth flip-flop is triggered by the falling edge 130 of the CLOCKB.

The pulse width of the signal E pulse is defined independently of the pulse width of the incoming signal 120. Any signal of sufficient width to trigger the first flip-flop is sufficient to generate a synchronous output pulse with defined pulse width.

FIG. 4 also shows a much wider pulse 130 being received at the clock input of the first flip-flop. Pulse 132 is approximately three clock cycles wide. The pulse causes a state transition in signals A and B asynchronously, which is registered in the synchronizer stage at the next rising edge 134 of CLOCKA, and output from the synchronizer stage as signals C and D upon the next falling edge 136 of CLOCKB. As previously described, signal D going high makes AND gate 56 TRUE, generating leading edge 138 of signal F. The trailing edge 140 of signal F is generated on the next falling edge 142 of CLOCKB, as previously described. The output of the invention on signal G provides pulses 144 and 146 in response to signal E and signal F. Despite the widely varying input pulse width, the output pulses on signal G are synchronized and of the same pulse width.

Conventional D-type flip-flops do not produce perfectly square edges as depicted in FIGS. 3 and 4. Skewing of pulses due to transition times in the circuitry created difficulties in prior-art circuits, as previously described, where a single input flip-flop was commonly employed to detect the asynchronous signal while clocked by asynchronous clock. If the asynchronous signals arrived too near the clock pulse, the D input of the flip-flop would be somewhere between the well defined low state, or 0, and high state, or 1. The flip-flop would therefore be clocked during the transition of the D input, and the pulse would be missed. The two-stage interface of the present invention overcomes the shortcomings of the prior art through the use of the strobe input stage prior to the synchronizer, while pulse width is maintained by the one-shot stage following the synchronizer.

The effect of the invention is illustrated in FIG. 5, in which the transition rates of all circuit signals are exaggerated. In FIG. 5, the first RD/WR strobe 144 arrives shortly before a rising edge 146 of CLOCKA. The first flip-flop 40 transitions almost immediately after the first RD/WR strobe is received. The skew rate of the resulting signals A and B is exaggerated to illustrate that when the rising edge 146 of CLOCKA is applied to the clock inputs of the second and third flip-flops neither signal A nor signal B has a well defined value. Accordingly, there is no completed state transition at the outputs of the second and third flip-flops. However, signals A and B remain high until the next rising edge 148 of CLOCKA, which again clocks the second and third flip-flops sampling signals A and B. A state transition does occur in the second and third flip-flops on that clock pulse. Signals C and D transition on the next falling edge 149 of CLOCKB when the fourth and fifth flip-flops are triggered.

The next RD/WR strobe 150 arrives just after the next rising edge 152 of CLOCKA. Signals A and B accordingly change states immediately after the rising edge 152 of CLOCKA. The state transition is not detected by the synchronizing stage until the next rising edge 154 and is manifested in signals C and D after the next falling edge 156 of CLOCKB. in signals C and D. Signals E and F are generated in the same manner as previously described, synchronized with the falling edges of CLOCKB. Accordingly, an input pulse will not be missed, regardless of when it occurs.

As described, the present invention produces synchronized pulses with constant pulse width from asynchronous pulses of varying frequency and pulse width. The Nyquist criterion has been relaxed, allowing CLOCKA to operate at a frequency of only 1.25 times the data transfer frequency. This relaxation allows greater flexibility in interfacing digital circuits to achieve the greatest data transfer band width.

Having now described the present invention in detail as required by the Patent Statutes, those skilled in the art will recognize minor modifications to achieve specific implementations of the invention. Such modifications are within the scope and intent of the invention, as defined in the following claims.

What is claimed is:

1. A circuit for converting incoming asynchronous pulses to synchronous pulses of constant pulse width comprising:
    a first clock signal having rising edges;
    a second clock signal having falling edges;
    an input means receiving the incoming pulse and having first complementary output signals toggles in response to the asynchronous pulse;
    a synchronizer means including a first means for capturing the complementary output signals responsive to the rising edge of the first clock and providing first intermediate outputs responsive to the falling edge of the second clock and producing second intermediate outputs;
    third means for capturing the second intermediate output responsive to the falling edge of the second clock and providing inverted third intermediate outputs;
    means for combining the second and third intermediate outputs in a logical AND to produce fourth intermediate outputs; and
    means for combining the fourth intermediate outputs in a logical OR to provide a synchronized output.

2. A circuit as defined in claim 1 for use in a controller having a system clock wherein the first clock signal has twice the frequency of the system clock and the second clock signal has substantially the same frequency as the first clock signal but phase-shifted to lag the first clock signal, and wherein the first capturing means is responsive to the rising edge of the first clock signal, the second capturing means and third capturing means are responsive to the falling edge of the second clock signal.

3. A circuit for converting incoming asynchronous pulses to synchronous pulses of constant pulse width comprising:
    a first clock signal having leading and trailing edges;
    a second clock signal having leading and trailing edges;
    a first toggling flip-flop receiving the asynchronous pulses on a clock input and having a first inverting output and second non-inverting output,
    a second flip-flop responsive to the leading edge of the first clock signal and connected to the non-inverting output of the first flip-flop, the second flip-flop providing a first intermediate output signal;
    a third flip-flop responsive to the leading edge of the first clock signal, and connected to the inverting output of the first flip-flop, the third flip-flop providing a second intermediate output signal;
    a fourth flip-flop responsive to the trailing edge of the second clock signal, receiving the first intermediate output and providing a third intermediate output;
    a fifth flip-flop responsive to the trailing edge of the second clock signal, receiving the second intermediate output and providing a fourth intermediate output;
    a sixth flip-flop responsive to the trailing edge of the second clock signal, receiving the third intermediate output and providing a fifth intermediate output;
    a seventh flip-flop responsive to the trailing edge of the second clock signal, receiving the fourth intermediate output and providing a sixth intermediate output;
    a first AND gate receiving the third intermediate output and the fifth intermediate output;
    a second AND gate receiving the fourth intermediate output and the sixth intermediate output; and
    an OR gate connected to the first and second AND gates, the OR gate providing a system output.

* * * * *